(12) United States Patent
Wang et al.

(10) Patent No.: US 8,339,109 B2
(45) Date of Patent: Dec. 25, 2012

(54) CHARGING CIRCUIT

(75) Inventors: Chua-Chin Wang, Kaohsiung (TW);
Shao-Fu Yen, Tainan County (TW);
Jr-Shang Shie, Kaohsiung (TW)

(73) Assignee: Acer Incorporated, New Taipei (TW)

( * ) Notice: Subject to any disclaimer, the term of this patent is extended or adjusted under 35 U.S.C. 154(b) by 428 days.

(21) Appl. No.: 12/727,263

(22) Filed: Mar. 19, 2010

(65) Prior Publication Data
US 2011/0127971 A1 Jun. 2, 2011

(30) Foreign Application Priority Data
Dec. 1, 2009 (TW) .............................. 98141073 A (51) Int. Cl.
*H02J 7/06* (2006.01)
*H02J 7/24* (2006.01)

(52) U.S. Cl. ........................................................ 320/163
(58) Field of Classification Search ................... 320/158, 320/159, 163, 164
See application file for complete search history.

(56) References Cited

U.S. PATENT DOCUMENTS

| | | | | |
|---|---|---|---|---|
| 6,002,239 | A * | 12/1999 | Maloizel ........................ | 320/136 |
| 6,492,792 | B1 * | 12/2002 | Johnson et al. ................ | 320/136 |
| 6,856,176 | B2 * | 2/2005 | Ajit ................................ | 327/108 |
| 7,402,981 | B2 * | 7/2008 | May et al. ...................... | 320/137 |
| 7,589,499 | B2 * | 9/2009 | Denning et al. ............... | 320/134 |
| 8,269,468 | B2 * | 9/2012 | Ju et al. ......................... | 320/164 |

FOREIGN PATENT DOCUMENTS

| | | |
|---|---|---|
| CN | 101252286 | 8/2008 |
| CN | 101286646 | 10/2008 |
| JP | 10-066275 | 3/1998 |
| JP | 10-094186 | 4/1998 |

OTHER PUBLICATIONS

"First Office Action of China counterpart application" issued on Aug. 23, 2012, p1-p5, in which the listed references were cited.

* cited by examiner

*Primary Examiner* — Ramy Ramadan
(74) *Attorney, Agent, or Firm* — Jianq Chyun IP Office (57) ABSTRACT

A charging circuit integrated into a chip, comprising a charging unit, a switch unit, a biasing unit, a voltage-dividing unit, and a comparing unit. The charging unit is connected between a power supply input and a load for outputting a constant current based on a constant bias voltage supplied by the power supply input in order to charge the load. The switch unit is connected between the charging unit and the power supply input for turning on or cutting off the charging unit. The voltage-dividing unit generates a first signal to the comparing unit according to a voltage of the load. The biasing unit outputs a second signal having a constant voltage to the comparing unit. The comparing unit compares the first signal with the second signal for cutting off or turning on the switch unit, bringing the charging unit to charge or stop charging the load, respectively.

10 Claims, 7 Drawing Sheets

CHARGING CIRCUIT

FIELD OF THE INVENTION

The present invention relates to a charging circuit, and more particularly, to a low-power charging circuit that enables fast charging, and protects a battery against overcharge at the same time.

BACKGROUND OF THE INVENTION

Currently, a rechargeable battery can be charged in one of the following four modes, namely, constant current (CC) charging mode, constant voltage (CV) charging mode, pulse charging mode, and constant current-constant voltage (CC-CV) charging mode.

In the CC charging mode, the battery can be fully charged within a short time. However the charging efficiency becomes poor, when the battery is close to fully-charged state. Besides, an overcharge protective mechanism is required to protect the battery from overcharge. Therefore, the CC mode charging circuit requires a high cost.

In the CV charging mode, the charging circuit regulates the magnitude of charging current according to a voltage difference between the battery voltage and a pre-defined charging voltage. That is, the charging current gradually drops when voltage difference becomes smaller. Since the CV charging mode does not require a protective mechanism to protect the battery against overcharge, the relatively larger voltage difference at the early stage of charging would possibly result in an overcharged state to cause damage to the battery.

In the pulse charging mode, a pulse current is periodically supplied to charge a battery. That is, in the process of charging, the electrolyte in the battery have plenty of intervals to buffer neutralization in the chemical reaction such that different electrolytes can balance chemical substance drift to improve the uniformity of electrolyte reaction and accordingly, the life of the battery. However, up to date, there is not a recognized way for determining the best pulse charging frequency and interval.

In the CC-CV charging mode, the battery is initially charged in the CC mode. When the battery voltage has reached at a pre-defined voltage, the battery is then charged in the CV mode such that the charging current drops with the rise of the battery voltage. When the charging current drops to zero, it is considered that the battery has been 100% charged. However, in the CC-CV mode, since it must wait until the charging current drops to zero in the final stage of charging, the charging time is prolonged.

Therefore, all the prior art charging circuits fail to enable fast charge and overcharge protection at the same time.

SUMMARY OF THE INVENTION

A primary object of the present invention is to provide a charging circuit that enables fast charge and protects a battery from overcharge.

To achieve the above and other objects, the charging circuit according to the present invention is integrated into a chip, comprising a charging unit, a switch unit, a biasing unit, a voltage-dividing unit, and a comparing unit. The charging unit is connected to and between a power supply input and a load for outputting a constant current based on a constant voltage power supply supplied by the power supply input in order to charge the load. The switch unit is connected to and between the charging unit and the power supply input for turning on or cutting off the charging unit. The biasing unit is connected to the charging unit and the switch unit for supplying a first bias voltage to the charging unit. The voltage-dividing unit is connected at an end to the load and the charging unit for generating a first signal according to a voltage of the load. The comparing unit is connected to the switch unit, the biasing unit and the voltage-dividing unit for receiving a second signal generated by the biasing unit and the first signal generated by the voltage-dividing unit, comparing the first signal with the second signal, and, based on a comparison result, outputting a second bias voltage to the switch unit for cutting off or turning on the switch unit, so that the charging unit is caused to charge or stop charging the load, respectively.

In the present invention, the charging unit is a first p-type transistor, and the switch unit is a second p-type transistor.

In the present invention, the second signal corresponding to stop charging has a voltage value larger than that of the second signal corresponding to recharging of the load after being fully charged.

In the present invention, the voltage-dividing unit comprises only an n-type transistor and a plurality of p-type transistors connected in series, and the p-type transistors respectively have a drain and a gate connected to each other, and the first signal is output from the drain of one of the p-type transistors.

According to the above description, it can be found the charging circuit of the present invention provides one or more of the following advantages:

(1) With the comparing unit, the charging circuit is able to control charging or not so as to extend the service life of the load.

(2) With the first p-type transistor that charges the load in the constant current mode, the charging circuit allows the load to be charged at an increased speed.

DETAILED DESCRIPTION OF THE PREFERRED EMBODIMENTS

Figure 1:
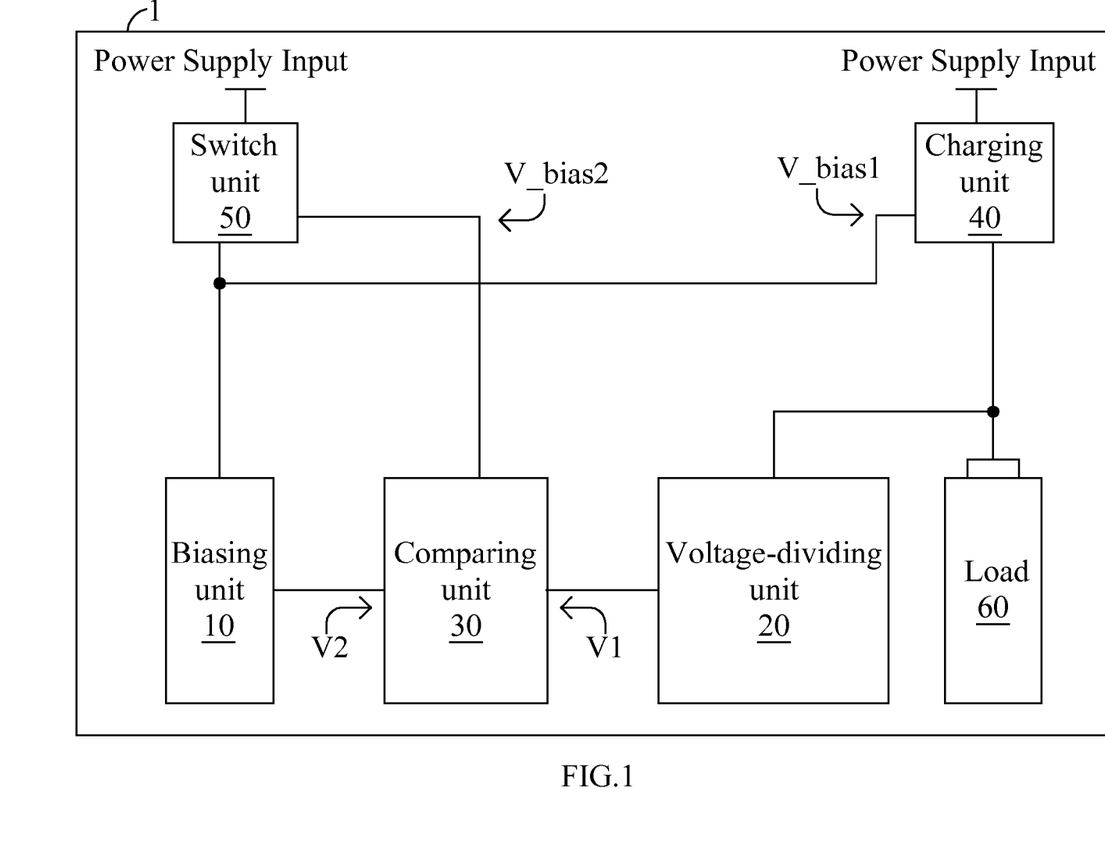
FIG. 1 is a block diagram of a charging circuit according to the present invention.

Please refer to FIG. 1, which is a block diagram of a charging circuit 1 according to the present invention. As shown, the charging circuit 1 comprises a charging unit 40, a switch unit 50, a biasing unit 10, a voltage-dividing unit 20, and a comparing unit 30. The charging unit 40 is connected to and between a power supply input VDD and a load 60 for charging the load 60 in a constant current (CC) mode with a constant voltage (CV) supplied by the power supply input VDD. The switch unit 50 is connected to and between the charging unit 40 and the power supply input VDD to turn on or cut off the charging unit 40. In the present invention, the charging unit 40 and the switch unit 50 are preferred p-type transistors.

The biasing unit 10 is connected to the charging unit 40 and the switch unit 50 for supplying a first bias voltage V_bias1 to the charging unit 40. The voltage-dividing unit 20 is connected at an end to the load 60 and the charging unit 40, and generates a first signal V1 according to a voltage of the load 60. The comparing unit 30 is connected to the switch unit 50, the biasing unit 10 and the voltage-dividing unit 20 to receive the first signal V1 generated by the voltage-dividing unit 20 and a second signal V2 generated by the biasing unit 10, and compares a voltage value of the first signal V1 with a voltage value of the second signal V2, and outputs a second bias voltage value V_bias2 to the switch unit 50 according to a signal generated from the comparison, so that the switch unit 50 is turned on or cut off for the charging unit 40 to stop or continue charging the load 60, respectively.

Figure 2:
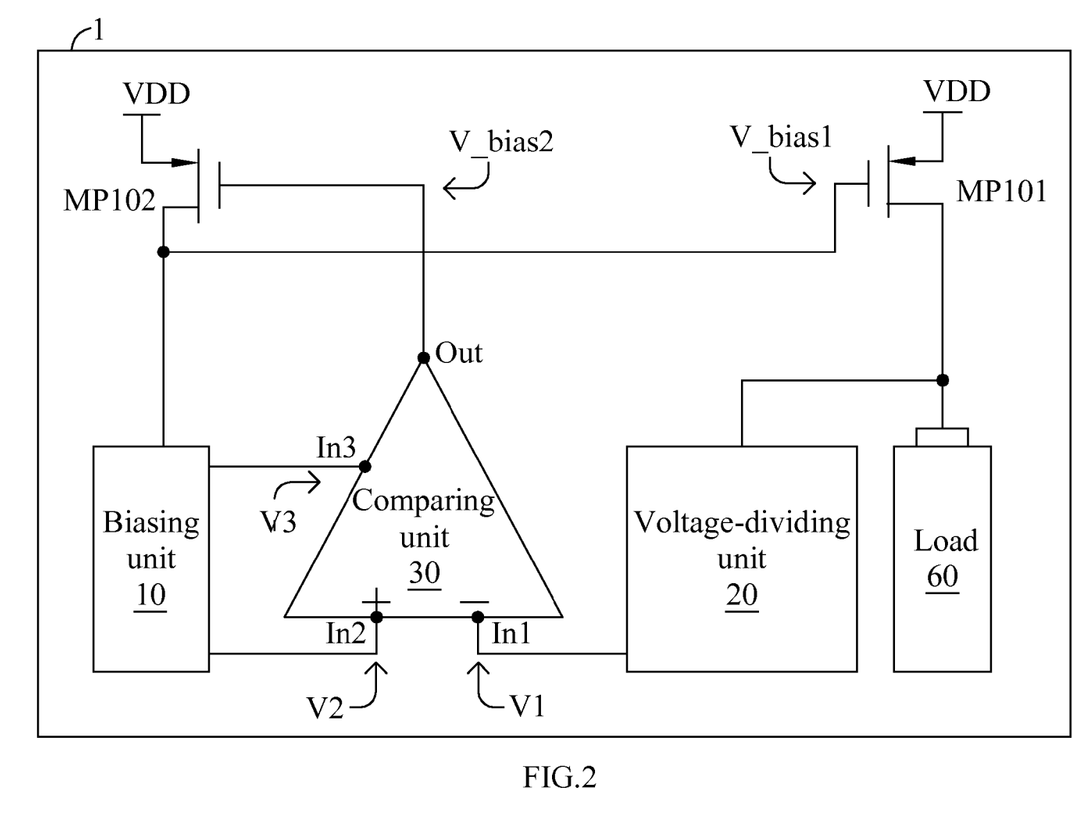
FIG. 2 is a circuit diagram according to a preferred embodiment of the charging circuit of the present invention.

Please refer to FIG. 2, which is a circuit diagram of a preferred embodiment of the charging circuit according to the present invention. As shown, the charging circuit 1 according to the preferred embodiment thereof comprises a first p-type transistor MP101, a second p-type transistor MP102, a biasing unit 10, a voltage-dividing unit 20, and a comparing unit 30.

The first p-type transistor MP101 has a source connected to a power supply input VDD for receiving a power supply having a constant voltage, which is preferably around 5 volts (V), and a drain connected to a load 60 for charging the load 60 in the constant current (CC) mode. The load 60 is preferably a lithium battery.

The second p-type transistor MP102 has a source and a drain respectively connected to the power supply input VDD and a gate of the first p-type transistor MP101.

The biasing unit 10 supplies a first bias voltage V_bias1 to the gate of the first p-type transistor MP101, so as to turn on or cut off the first p-type transistor MP101. The biasing unit 10 is mainly used to supply stable voltage outputs, comprising a second signal V2, a third signal V3, and the first bias voltage V_bias1.

The voltage-dividing unit 20 is connected to the load 60 and the drain of the first p-type transistor MP101, and generates a first signal V1 according to a voltage of the load 60.

The comparing unit 30 has a first input In1, a second input In2, a third input In3, and an output Out. The first input In1 is a negative input of the comparing unit 30, and the second input In2 is a positive input of the comparing unit 30. The negative input In1 is connected to the voltage-dividing unit 20 for receiving the first signal V1. The positive input In2 and the third input In3 are connected to two different points of the biasing unit 10 for receiving the second signal V2 and the third signal V3 generated by the biasing unit 10, respectively. The output Out is connected to a gate of the second p-type transistor MP102. When the first signal V1 has a voltage value smaller than a voltage value of the second signal V2, the output Out will supply a high-level second bias voltage V_bias2 to the gate of the second p-type transistor MP102 so that the second p-type transistor MP102 is cut off and the first p-type transistor MP101 is turned on to charge the load 60. Preferably, the high-level second bias voltage V_bias2 has a voltage value of 5V. On the other hand, when the first signal V1 has a voltage value larger than a voltage value of the second signal V2, the output Out will supply a low-level second bias voltage V_bias2 to the gate of the second p-type transistor MP102 to turn on the second p-type transistor MP102. At this point, the first bias voltage V_bias1 has a voltage value equal to that supplied by the power supply input VDD such that the first p-type transistor MP101 is cut off to stop charging the load 60. Preferably, the low-level second bias voltage V_bias2 has a voltage value of 0V.

Figure 3:
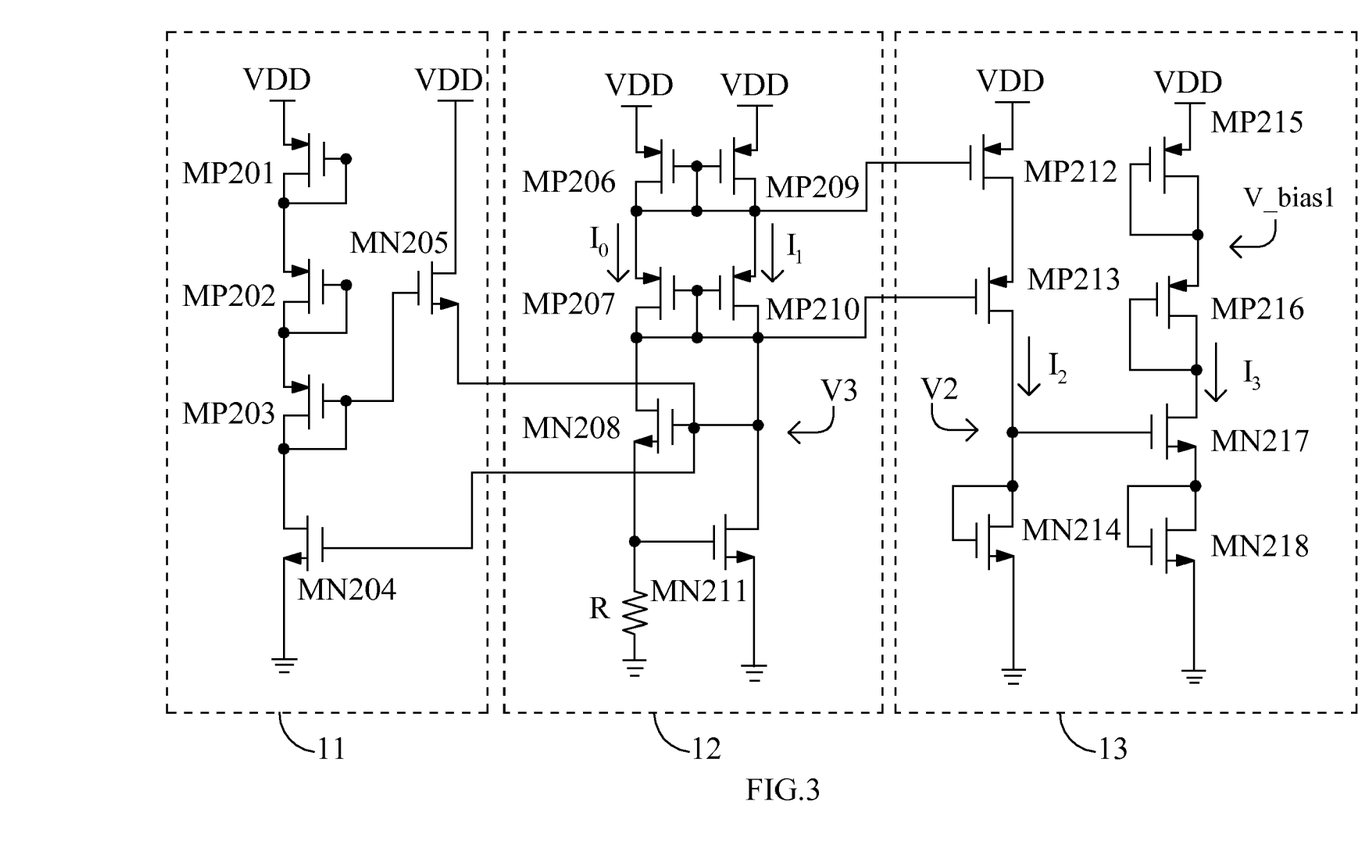
FIG. 3 is a circuit diagram of a biasing unit according to a preferred embodiment of the charging circuit of the present invention.

Please refer to FIG. 3, which is a circuit diagram of the biasing unit 10 according to a preferred embodiment of the charging circuit of the present invention. As shown, the biasing unit 10 comprises a starting section 11, a reference section 12, and a linking section 13. The reference section 12 is connected to and between the starting section 11 and the linking section 13. The starting section 11 drives the reference section 12 to generate the third signal V3 to the third input In3 of the comparing unit 30 and to the linking section 13 so as to drive the linking section 13. The linking section 13 supplies the first bias voltage V_bias1 and the second signal V2 to the gate of the first p-type transistor MP101 and the second input In2 of the comparing unit 30, respectively.

The reference section 12 comprises four p-type transistors MP206, MP207, MP209 and MP210; two n-type transistors, MN208, MN211; and a resistor R. The four p-type transistors MP206, MP207, MP209 & MP210 provide two identical currents $I_0$ and $I_1$, such that:

$$I_o \cdot R = Vt_{211} + \left(\frac{2I_1}{\beta}\right)^{1/2} \quad (1)$$

$$I_o = I_1 = \frac{Vt_{209}}{R} + \left(\frac{1}{\beta_{211} \cdot R^2}\right) + \frac{1}{R} \cdot \left(\frac{2Vt_{209}}{\beta_{211}R} + \frac{2Vt_{209}}{\beta_{211}^2 R^2}\right)^{1/2} \quad (2)$$

where $Vt_{209}$ and $Vt_{211}$ are thermal voltages of the p-type transistors MP209 and the n-type transistor MN211, respectively, which have a value about 25 mV at normal room temperature; and $\beta_{211}$ is a current gain of the n-type transistor MN211.

It can be found from the above two equations (1) and (2) that currents $I_0$ and $I_1$ are independent of the voltage value provided by the power supply input VDD. Therefore, the present invention sets up a circuit independent of the input voltage value.

When a voltage difference $Vds_{211}$ between the drain and the source of the n-type transistor MN211 is smaller than the voltage of the third signal V3, it would possibly cause cut-off of the n-type transistor MN211. Therefore, in the present invention, the starting section 11 is provided to overcome the problem of a possibly cut-off of the n-type transistor MN211. The starting section is composed of three p-type transistors MP201~MP203 and two n-type transistors MN204 & MN205. When the $Vds_{211}$ is a low voltage, the MN204 will be cut off and a voltage difference $Vds_{204}$ between the drain and the source of the MN204 turns to high level to thereby turn on the n-type transistor MN205, which in turn brings the voltage value of the $Vds_{211}$ to rise and turns on the MN204 so that the voltage value of the $Vds_{204}$ drops to shut off the MN205. In this manner, a constant voltage value of the third signal V3 supplied from the circuit formed by the MP206, MP207, MP209, MP210, MN208 and R is not affected.

The linking section 13 receives the voltage supplied by the reference section 12 and then generates a current $I_2$ on p-type transistors MP212 and MP213. The linking section 13 further generates the second signal V2 via an n-type transistor MN214, which has a temperature coefficient similar to that of the p-type transistors MP212 and MP213. The second signal V2 is able to turn on an n-type transistor MN217 to thereby generate a current $I_3$, which is used to turn on p-type transistors MP215 and MP216 so as to output the first bias voltage V_bias1 to the gate of the first p-type transistor MP101. The first bias voltage has a voltage value equal to a difference between the voltage value at the power supply input and the voltage difference between the source and the drain of the p-type transistor MP215.

Figure 4:
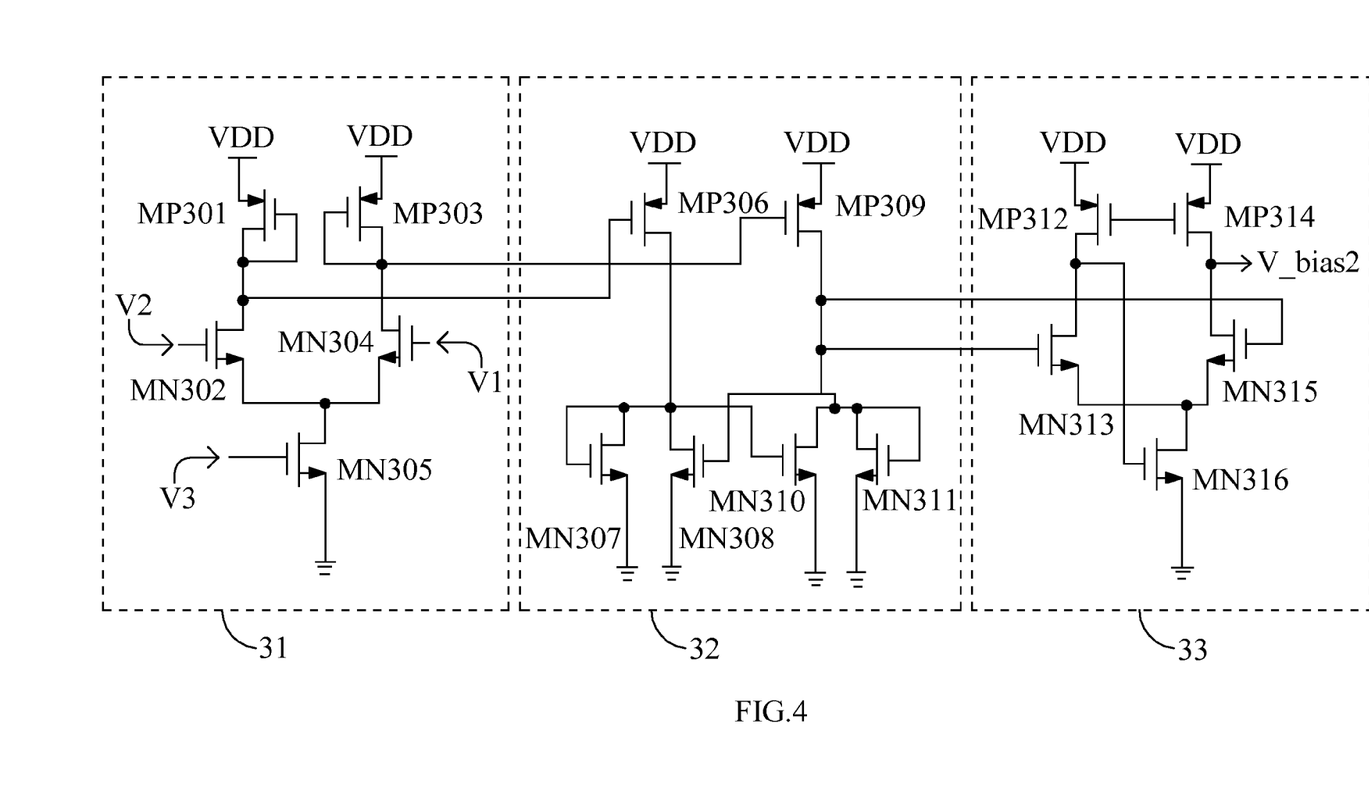
FIG. 4 is a circuit diagram of a comparing unit according to a preferred embodiment of the charging circuit of the present invention.

Please refer to FIG. 4, which is a circuit diagram of the comparing unit 30 according to a preferred embodiment of the charging circuit of the present invention. As shown, the comparing unit 30 comprises a differential section 31, a lagging section 32, and an output section 33. The lagging section 32 is connected to and between the differential section 31 and the output section 33. The differential section 31 compares the first signal V1 with the second signal V2 to find out a voltage value difference between them, and the lagging section 32 can drive the output section 33 to output a high-level second bias voltage or a low-level second bias voltage.

In the differential section 31, p-type transistors MP301 and MP303 together form a current mirror; n-type transistors MN302 & MN304 together form a differential pair. The current mirror and the differential pair together form a differential amplifier for comparing the first signal V1 with the second signal V2 to find out the voltage difference therebetween. In the lagging section 32, p-type transistors MP306 & MP309 and n-type transistors MN307, MN308, MN310 and MN311 together form a circuit with lagging effect. The output section 33 comprises p-type transistors, MP312 and MP314, and n-type transistors, MN313, MN315 and MN316, to form a self-biased and differential-to-single-ended converter.

Gates of the MN302 and MN304 are positive input and negative input of the comparing unit 30, respectively, for receiving the second signal V2 and the first signal V1, respectively. In the present invention, with the lagging effect of the comparing unit 30, charging of the load 60 immediately stops when a pre-defined charge-completed voltage is reached; and the first p-type transistor is turned on again to charge only when the voltage value of the charge-completed load 60 drops to a pre-defined charge-required voltage. The pre-defined charge-completed voltage has a voltage value larger than that of the pre-defined charge-required voltage, and the voltage value of the pre-defined charge-completed voltage is preferably 4.2V, and the voltage value of the pre-defined charge-required voltage is preferably 4.1V. With these arrangements, it is able to avoid incorrect charging caused by unstable voltage value supplied by the power supply input VDD, and protect the battery against repeated charging and discharging due to charge and discharge at the same time. Thus, the load 60 can have an extended service life.

Figure 5:
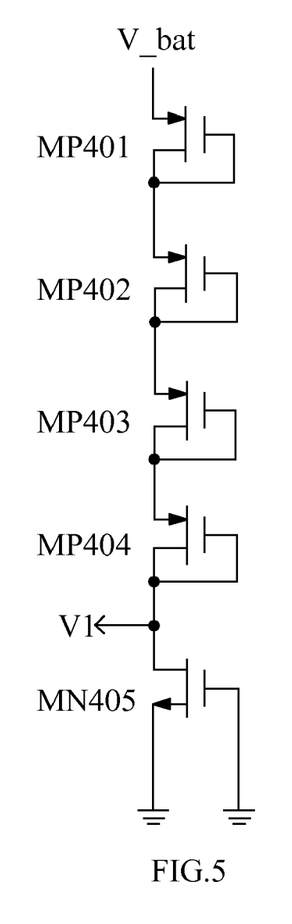
FIG. 5 is a circuit diagram of a voltage-dividing unit according to a preferred embodiment of the charging circuit of the present invention.

Please refer to FIG. 5, which is a circuit diagram of the voltage-dividing unit 20 according to a preferred embodiment of the charging circuit of the present invention. As shown, the voltage-dividing unit 20 comprises four identical p-type transistors MP401~MN404 and an n-type transistor MN405. It is particularly noted that, in the circuit diagram of the voltage-dividing unit 20 of the present invention, only transistors are used without any resistor that is usually used in conventional voltage-dividing circuits. In this way, reduced thermal noise and chip area can be achieved. Moreover, the p-type transistors respectively have a gate and a drain connected to each other to equivalently serve as a general diode for voltage division. Further, since transistors with the same properties are used, the manufacturing process thereof is same, and the voltage division effect is same given any temperature drift. Further, since the voltage-dividing unit 20 has two ends separately connected to the load 60 and ground, in the present invention, the length of the voltage-dividing unit 20 is lengthened to reduce the current flowed therethrough and reduce power consumption. In FIG. 5, the first signal V1 is output via the drain of MP404. However, it is understood what is illustrated in FIG. 5 is only exemplary and not intended to limit the present invention. That is, the first signal V1 can be otherwise output via the drain of MP403 or any other p-type transistors of the voltage-dividing unit 20.

Figure 6:
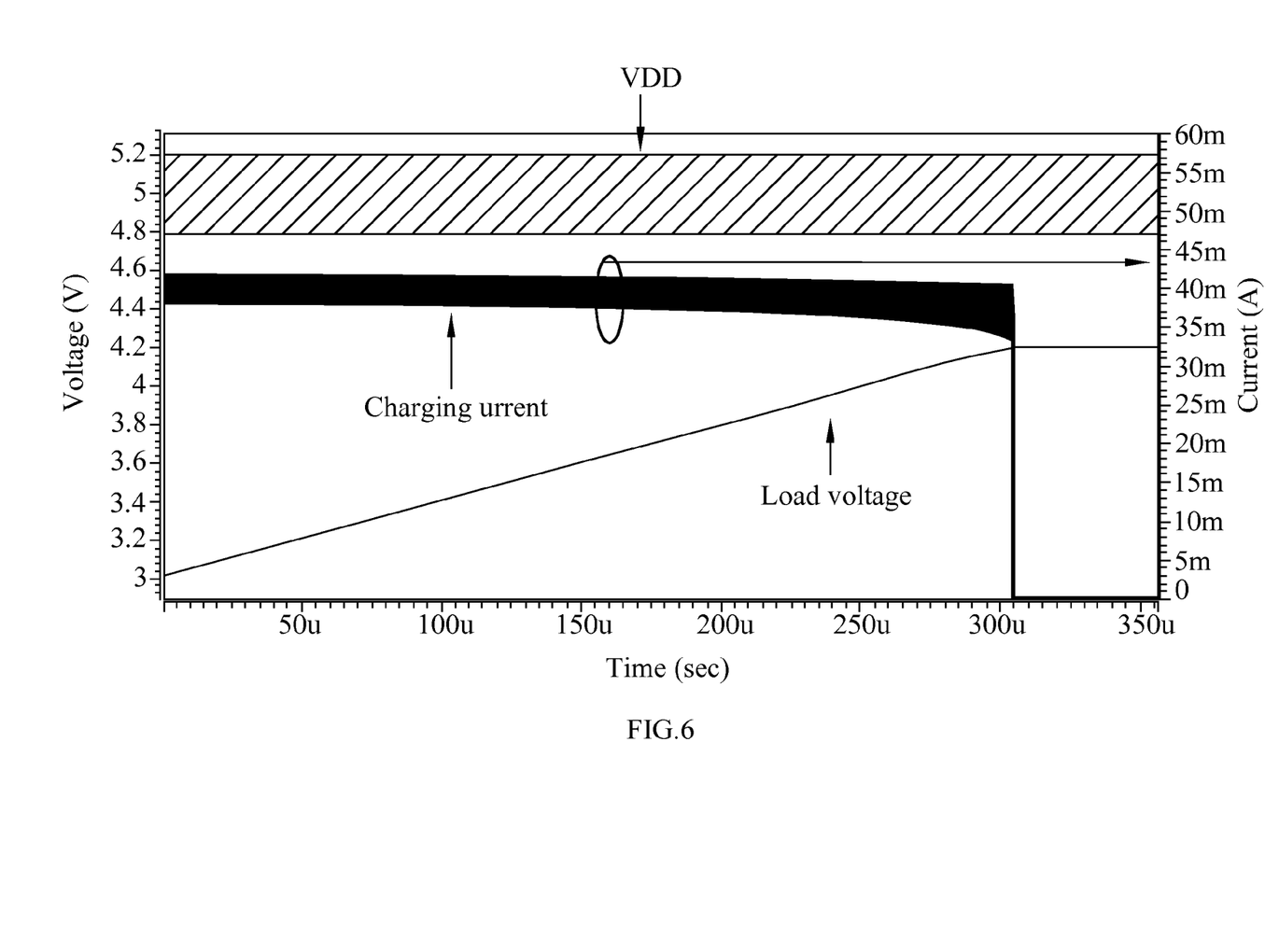
FIG. 6 is a chart showing the simulated result of the charging circuit according to the present invention.

FIG. 6 is a chart showing a simulation result of the charging circuit according to the present invention. As shown, the horizontal axis indicates the length of time; the left vertical axis indicates the voltage value of the load 60; and the right vertical axis indicates the current value of the charged current. Here, while the input voltage has a voltage value drifting between 4.8V and 5.2V, the charged current is still stably maintained at about 40 mA. And, the charging circuit 1 will stop charging when the voltage value of the load 60 reaches at 4.2V.

Figure 7:
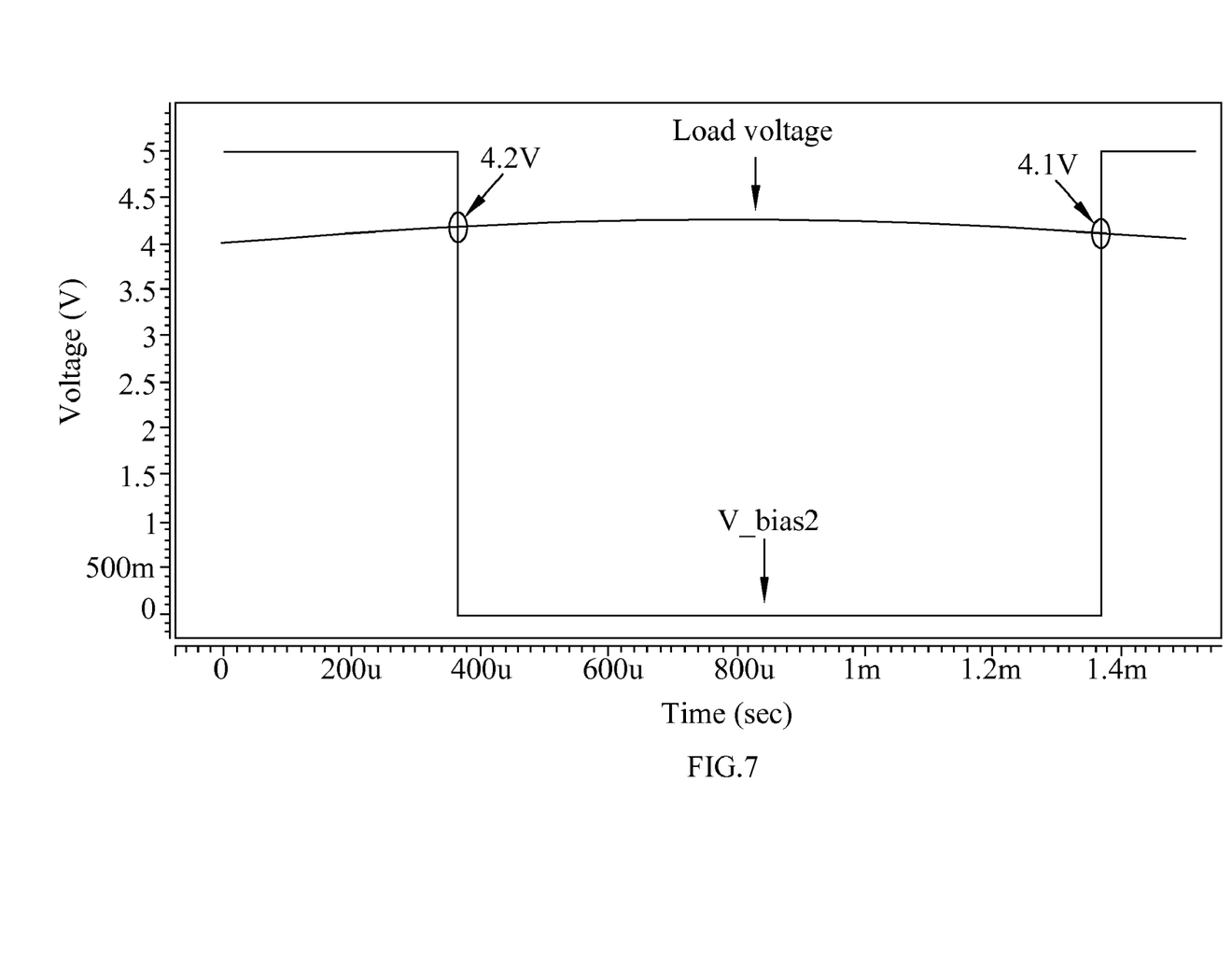
FIG. 7 is a chart showing the simulated load voltage value and second bias voltage according to the charging circuit of the present invention.

FIG. 7 is a chart showing the simulated load voltage value and second bias voltage according to the charging circuit of the present invention. In FIG. 7, the horizontal axis indicates the length of time and the vertical axis indicates the voltage value. In the course of charging, when the voltage value of the load 60 is higher than 4.2V, the second bias voltage V_bias2 will immediately drop to 0V, so that the charging circuit 1 stops charging. And, when the voltage value of the charge-completed load 60 becomes lower than 4.1V, the second bias voltage V_bias2 immediately rises to 5V, so that the charging circuit 1 starts charging again.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A charging circuit being integrated into a chip, comprising:
    a charging unit being connected to and between a power supply input and a load for outputting a constant current based on a constant voltage power supply supplied by the power supply input in order to charge the load;
    a switch unit being connected to and between the charging unit and the power supply input for turning on or cutting off the charging unit;
    a biasing unit being connected to the charging unit and the switch unit for supplying a first bias voltage to the charging unit;
    a voltage-dividing unit being connected at an end to the load and the charging unit for generating a first signal according to a voltage of the load; and
    a comparing unit being connected to the switch unit, the biasing unit and the voltage-dividing unit for receiving a second signal generated by the biasing unit and the first signal generated by the voltage-dividing unit, comparing the first signal with the second signal, and, based on a comparison result, outputting a second bias voltage to the switch unit for cutting off or turning on the switch unit, so that the charging unit is caused to charge or stop charging the load, respectively.

2. The charging circuit as claimed in claim 1, wherein the charging unit is a first p-type transistor, the switch unit is a second p-type transistor, and the second p-type transistor is connected at a drain thereof to a gate of the first p-type transistor.

3. The charging circuit as claimed in claim 2, wherein the comparing unit outputs the second bias voltage at a high level to a gate of the second p-type transistor when the first signal is smaller than the second signal, so that the second p-type transistor is cut off and the first p-type transistor is turned on; and wherein the comparing unit outputs the second bias voltage at a low level to the gate of the second p-type transistor when the first signal is larger than the second signal, so that the second p-type transistor is turned on and the first p-type transistor is cut off.

4. The charging circuit as claimed in claim 1, wherein the biasing unit comprises a starting section, a reference section, and a linking section; the reference section being connected to and between the starting section and the linking section, the starting section driving the reference section to generate a third signal to the starting section and the linking section for driving the linking section, so that the linking section supplies the first bias voltage and the second signal to the charging unit and the comparing unit, respectively.

5. The charging circuit as claimed in claim 1, wherein the comparing unit comprises a differential section, a lagging section and an output section; the lagging section being connected to and between the differential section and the output section, the differential section comparing the first signal with the second signal, and the lagging section actuating the output section to output the second bias voltage.

6. The charging circuit as claimed in claim 5, wherein the differential section comprises a current mirror, a differential pair, and an n-type transistor; the differential pair being connected to and between the current mirror and the n-type transistor for receiving the first and the second signal, and transmitting a voltage difference between the first and the second signal to the lagging section.

7. The charging circuit as claimed in claim 6, wherein, based on the voltage difference between the first and the second signal, the lagging section controls the output section to output the second bias voltage.

8. The charging circuit as claimed in claim 5, wherein the second signal corresponding to stop charging has a voltage value larger than that of the second signal corresponding to recharging of the load after being fully charged.

9. The charging circuit as claimed in claim 1, wherein the voltage-dividing unit is consisted of an n-type transistor and a plurality of p-type transistors connected in series; the p-type transistors each having a drain connected to a gate thereof; and the first signal being output from the drain of one of the p-type transistors.

10. The charging circuit as claimed in claim 1, wherein the load is a lithium battery.

\* \* \* \* \*